(12) United States Patent
Teramoto

(10) Patent No.: US 6,848,023 B2
(45) Date of Patent: Jan. 25, 2005

(54) CACHE DIRECTORY CONFIGURATION METHOD AND INFORMATION PROCESSING DEVICE

(75) Inventor: Yasuhiro Teramoto, Hadano (JP)

(73) Assignee: Hitachi, Ltd., Tokyo (JP)

( * ) Notice: Subject to any disclaimer, the term of this patent is extended or adjusted under 35 U.S.C. 154(b) by 611 days.

(21) Appl. No.: 09/741,980

(22) Filed: Dec. 19, 2000

(65) Prior Publication Data

US 2001/0032299 A1 Oct. 18, 2001

(30) Foreign Application Priority Data

Mar. 17, 2000 (JP) .......................................... 2000-076699

(51) Int. Cl.$^7$ .............................................. G06F 12/00
(52) U.S. Cl. ........................ 711/127; 711/129; 711/173; 711/141
(58) Field of Search ................................ 711/141, 173, 711/127, 129, 120, 124

(56) References Cited

U.S. PATENT DOCUMENTS

| 5,265,232 A | * | 11/1993 | Gannon et al. ............. 711/124 |
| 5,860,078 A | * | 1/1999 | Emmot .......................... 711/3 |
| 5,909,697 A | * | 6/1999 | Hayes et al. ................ 711/144 |
| 6,073,212 A | * | 6/2000 | Hayes et al. ................ 711/122 |
| 6,311,253 B1 | * | 10/2001 | Chang et al. ............... 711/122 |
| 6,480,927 B1 | * | 11/2002 | Bauman ...................... 710/317 |

FOREIGN PATENT DOCUMENTS

JP          2000-172564          6/2000

OTHER PUBLICATIONS

Handy, "The Cahce Memory Handbook", 2$^{nd}$ edition Academic Press 1998, pp. 14–22 and 50–63.*

* cited by examiner

*Primary Examiner*—Mano Padmanabhan
*Assistant Examiner*—Paul A Baker
(74) *Attorney, Agent, or Firm*—Townsend and Townsend and Crew LLP

(57) ABSTRACT

The present invention relates to a cache directory configuration method and an information processing device that implements the same. In an embodiment of this invention, each cache directory is divided up into a plurality of units that can be operated in a parallel manner. A plurality of search requests can be processed by each cache directory concurrently. Thus this embodiment allows the hardware requirements for the cache directory to be restricted while providing cache directory search performance higher than that of the conventional technology.

23 Claims, 10 Drawing Sheets

PRIOR ART

CACHE DIRECTORY CONFIGURATION METHOD AND INFORMATION PROCESSING DEVICE

CROSS-REFERENCES TO RELATED APPLICATIONS

This application is related to and claims priority from Japanese Patent Application No. 2000-076699, filed on Mar. 17, 2000.

BACKGROUND OF THE INVENTION

The present invention relates generally to cache organization in a multi-processor environment and more particularly to cache directory coherence.

In multi-processor information processing devices where multiple processing devices share a main storage device and each processing device is equipped with a cache storage module for storing a copy of a section of the main storage device, a coherence control device is generally provided to assure consistency (coherence) between the main storage device and the cache storage module equipped in each of the processing devices. The coherence control device is equipped with a cache directory for each of the processing devices. A cache directory is a copy of the address tags (cache tags) stored in the cache of the processing device. When another processing device performs a write operation to the main storage device, the processing device, other than the processing device performing the write, searches the cache directory. If an address tag matching the write address is registered in the directory, the corresponding entry in the cache storage module in the processing device is reported to be invalid.

FIG. 1 [PRIOR ART] shows an example of a configuration of a conventional cache directory. Here, a cache directory 1 is a copy of an address tag stored in the cache of a processing device. A coherence control device contains a cache directory 1 for each processing device. When the processing device performs a block transfer from the main storage device to the cache storage module and newly registers an address tag, the same address tag is registered by way of a cache directory registration address interface 3 in the cache directory 1 entry indicated by a read/write pointer 11 by way of a cache directory index interface 2. When a write is performed to the main storage device from another processing device, the contents of the cache directory indicated by the read/write pointer 11 is read by way of the cache directory index interface 2, and the contents are stored in a read register 12. A comparator 14 then compares the contents of the read register 12 with the contents of a store address register 13 stored by way of a store address interface 4. If there is a match, the processing device is notified that the cache entry is invalid by way of an interface 5.

The main storage device shared by the plurality of processing devices is generally formed as a bank of independently operable, distinct address spaces. The throughput with the processing devices is high. With recent demands for higher speeds, the cache directory also requires a throughput similar to that of the main storage device. However, in the conventional cache directory architecture shown in FIG. 1, the cache directory has only one read path. Thus, the cache directory can perform searches only one at a time and no throughput improvements can be provided.

In addition to the above problems, the cache storage modules of processing devices are getting larger and larger, hence providing high cache directory search performance requires greater hardware capacity. With the high cache capacity used in current information processing devices where multiple processing devices are connected together, the hardware requirements are significant. Thus, there is a need to keep hardware requirements low while providing high cache directory search performance.

SUMMARY OF THE INVENTION

The present invention relates to a cache directory configuration method and an information processing device that implements the same. An embodiment of the present invention is used in an information processing device formed from a plurality of processing devices and a main storage device shared by the plurality of processing devices. The cache directory configuration method of the embodiment provides consistency (coherence) between the cache storage modules equipped in the processing devices and the main storage device.

Another embodiment of the present invention provides a cache directory configuration method and an information processing device implementing the same that keeps the hardware requirements low for cache directories, and is used to assure coherence between the cache storage modules of multiple processing devices and a main storage device, while increasing cache directory search performance.

Typically, cache directories are copies of address tags stored in cache storage modules in each of a plurality of processing devices and cache directories assure coherence between a main storage device and the plurality of processing devices. In an embodiment of this invention, each cache directory is divided up into a plurality of units that can be operated independently in a parallel manner. A plurality of search requests can be processed by each cache directory at the same or similar time, i.e., concurrently. Thus this embodiment allows the hardware requirements for the cache directory to be restricted while providing cache directory search performance higher than that of the conventional technology.

In an alternative embodiment of the present invention a cache directory configuration system for maintaining coherence between a plurality of caches, where each cache has a copy of a section of said main memory, is provided. The system includes, a cache directory, having copies of address tags stored in the plurality of caches, where the cache directory is divided into a plurality of parts; and a plurality of units for processing a plurality of search requests concurrently using said plurality of parts. The system may also include a selector module for partitioning a search address tag associated with the search request into a plurality of sections; and a comparison module, responsive to the search request, for determining if a first section of the plurality of sections matches an entry in a first part of the plurality of parts and when no match is indicated for any entry in the first part, returning a result. In another embodiment the system may also include, a comparison module, responsive to a search request of the plurality of search requests, for determining if the search request matches any entry in a part of the plurality of parts, and when a match is indicated, returning a result.

These and other embodiments of the present invention are described in more detail in conjunction with the text below and attached figures.

DESCRIPTION OF THE SPECIFIC EMBODIMENTS

The following are descriptions of embodiments of the present invention, with references to the figures. One embodiment uses two processing devices and a main memory, but alternative embodiments include a plurality of processors coupled to a main memory including a plurality of memory banks. Other combinations of processors and memory may readily be derived by one skilled in the art.

Figure 1:
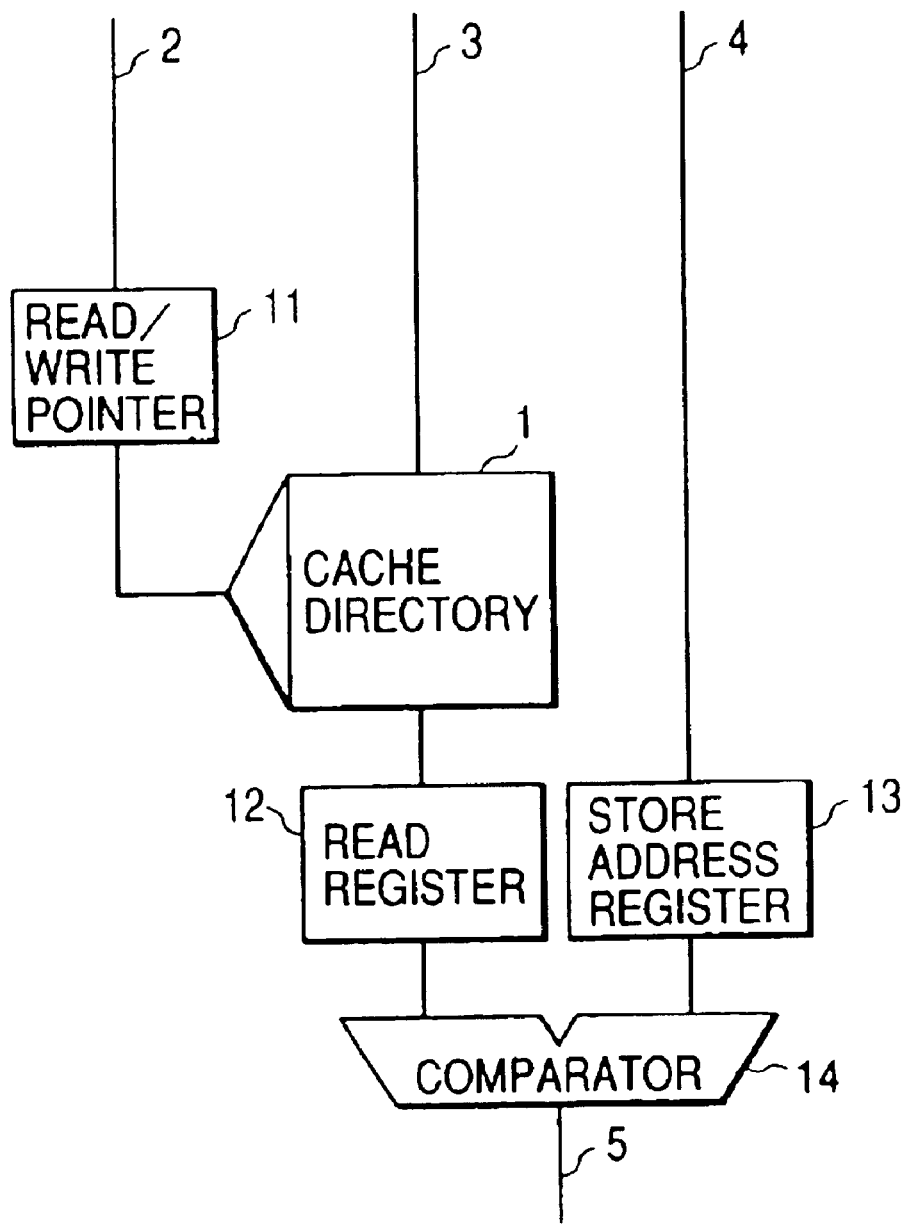
FIG. 1 is a schematic block diagram of a conventional coherence control device [Prior Art].
Figure 2:
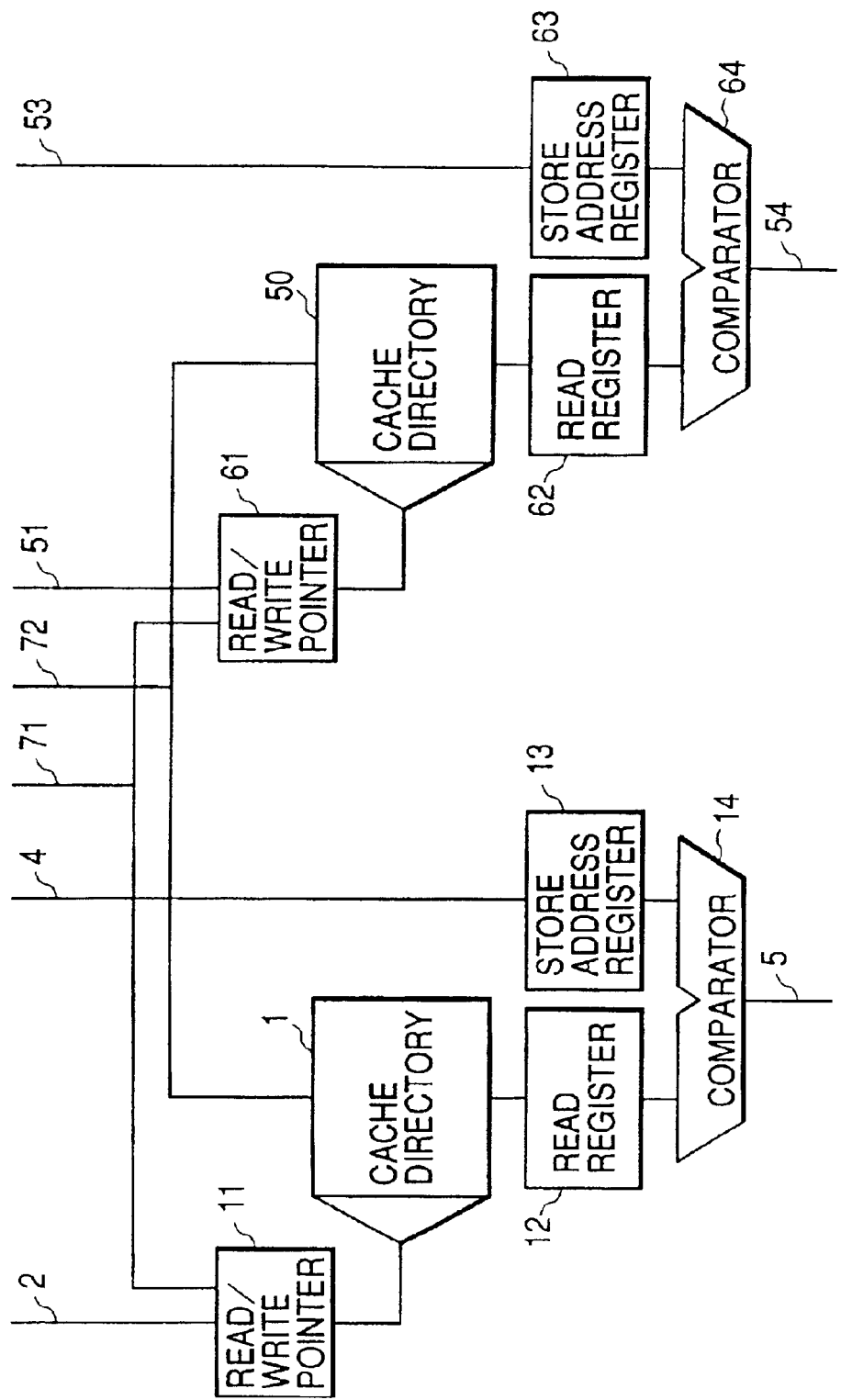
FIG. 2 shows a schematic block diagram of a coherence control device which keeps a copy of a cache directory of an embodiment of the present invention.

In one embodiment of the present invention to double the cache directory's search performance, another cache directory 50 is provided, as shown in FIG. 2. The same contents as the cache directory 1 from FIG. 1 would be registered in the cache directory 50. The processing devices perform block transfers from the main storage device to the cache storage module. When a new address tag is to be registered, the same address tag is registered by way of a cache directory registration address interface 72 in the entries in the cache directories 1, 50 as indicated by the read/write pointers 11, 61 by way of the cache directory index interface 71. When there are two cache directory search requests, the contents of the cache directories 1, 50 indicated by the read/write pointers 11, 61 are independently read by way of the cache directory index interfaces 2, 51. The contents are stored in the read registers 12, 62, and the contents of these read registers 12, 62 and the contents of the store address registers 13, 63 stored by way of the store address interfaces 4, 53 are compared by comparators 14, 64. The comparison results are output to the interfaces 5, 54.

With the cache directory configuration shown in FIG. 2, the cache directory search performance is doubled, but the cache directory also requires twice the capacity. Thus there is a cost vs. speed trade-off.

Figure 3:
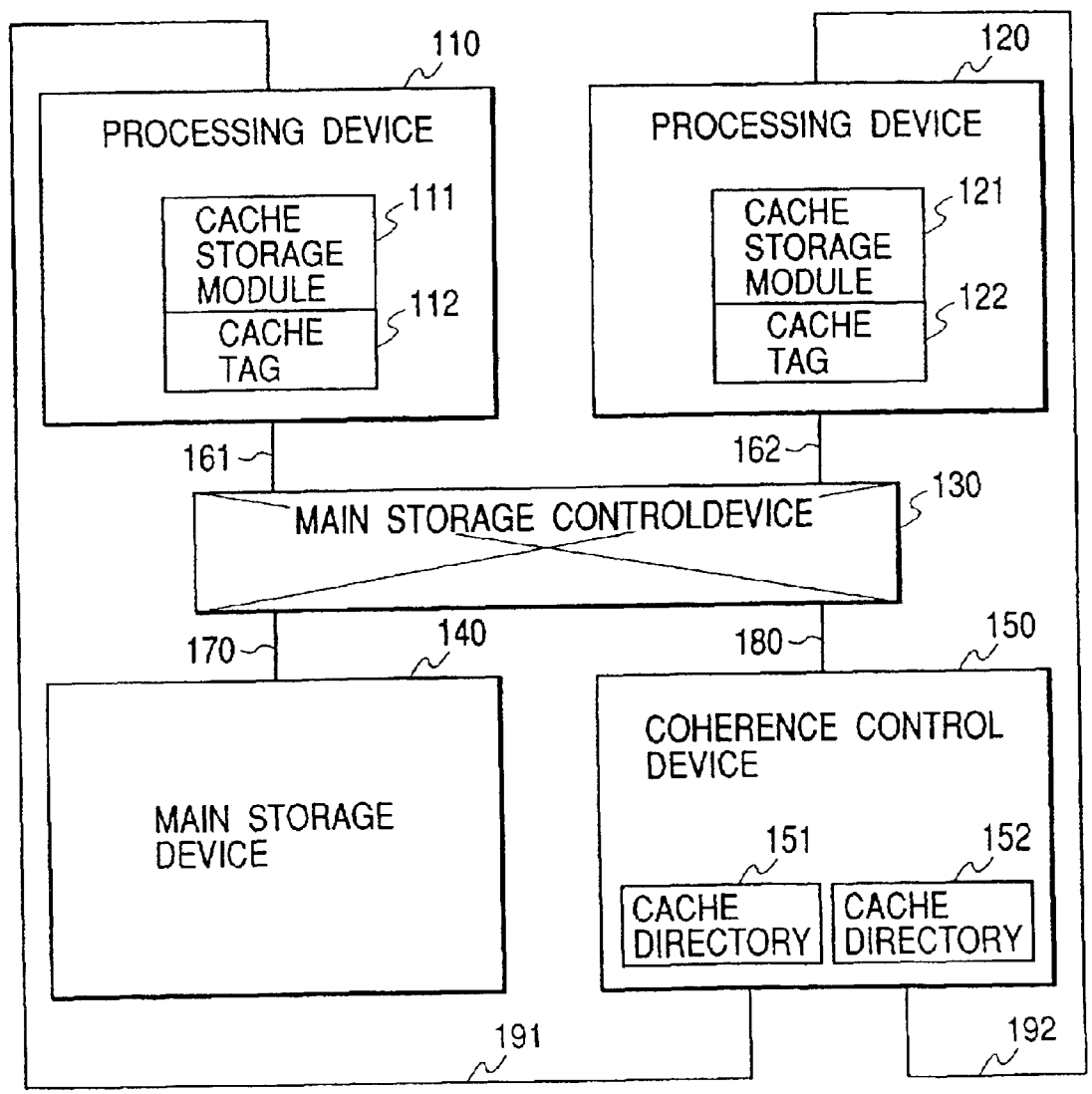
FIG. 3 gives a block diagram showing the overall architecture of an information processing device according to an embodiment of the present invention.

FIG. 3 is a drawing showing the architecture of an information processing device system according to an embodiment of the present invention. The information processing device of this embodiment includes two processing devices 110, 120, a main storage control device 130, a main storage device 140, and a coherence control device 150. Each of the processing devices 110, 120 includes cache storage modules 111, 121 storing copies of sections of the main memory device 140 and cache tags 112, 122 storing the addresses of the main memory areas of the blocks stored in the cache storage modules 111, 121. The coherence control device 150 serves to maintain consistency (coherence) between the cache storage modules 111, 121 of the processing devices 110, 120 and the main storage device 140. The coherence control device 150 includes cache directories 151, 152, which are copies of the cache tags 112, 122 in the caches in processing devices 110, 120. The processing devices 110, 120 are connected to the main storage control device 130 by interfaces 161, 162. The main storage control device 130 is connected to the main storage device 140 and the coherence control device 150 by interfaces 170, 180. The coherence control device 150 is connected to the processing devices 110, 120 by interfaces 191, 192.

When a read request is generated, the processing device 110 accesses the cache storage module 111. If the target data is present in the cache storage module 111, the target data is read directly from the cache storage module 111. If, on the other hand, the target data is not in the cache storage module 111, the processing device 110 transfers a block containing the target data from the main storage device 140 to the cache storage module 111 by way of the interface 161, the main storage control device 130, and the interface 170. The target data is then read from the cache storage module 111 and the address in the main storage area for the block (the address tag) is registered in the cache tag 112. When a write request is generated, the processing device 110 writes to the main storage device 140 by way of the interface 161, the main storage control device 130, and the interface 170. If old data is present in the cache storage module 111, this data is overwritten. The operations of the processing device 120 are similar to the operations of the processing device 110.

The main storage control device 130 sets up priorities for accesses to the main storage from the processing devices 110, 120, and accesses the main storage device 140 in sequence by way of the interface 170. Also, a processing device ID is added to main storage access information and transferred to the coherence control device 150 by way of the interface 180.

The main storage device 140 writes new contents in predetermined areas according to the main storage access issued from the main storage control device 130. The main storage device 140 also reads contents from predetermined areas. The main storage device 140 is formed as independent banks capable of operating in parallel. Each of the banks has a different address space.

The coherence control device 150 maintains consistency between the cache storage modules 111, 121 of the processing devices 110, 120 and the main storage device 140. The main storage access information of the processing devices 110, 120 are transferred from the main storage control device 130 and are continuously monitored by the coherence control device 150. The coherence control device 150 also updates and performs searches on the cache directories 151, 152, which are copies of the cache tags 112, 122 of the processing devices 110, 120. For example, if the processing device 110 reads a block from the main storage device 140, stores it into the cache storage module 111, and registers an address tag in the cache tag 112, the coherence control device 150 registers the same address tag in the cache directory 151. If the other processing device 120 performs a write to the main storage device 140, the coherence control device 150 searches the cache directory 151 of the processing device 110. If an address tag matching the write address is registered in the cache tag 112 of the cache storage module 111 of the processing device 110, a request to invalidate the cache entry is issued to the processing device 110 by way of the interface 191. The cache directory 152 for the processing device 120 is updated and searched in a similar manner.

The cache directories maintain coherence between the cache storage modules of the processing devices and the main storage device. Thus, the software can perform high-speed multi-processor operations without performing coherence control operations. Some embodiments of the present invention relate to this cache directory.

Figure 4:
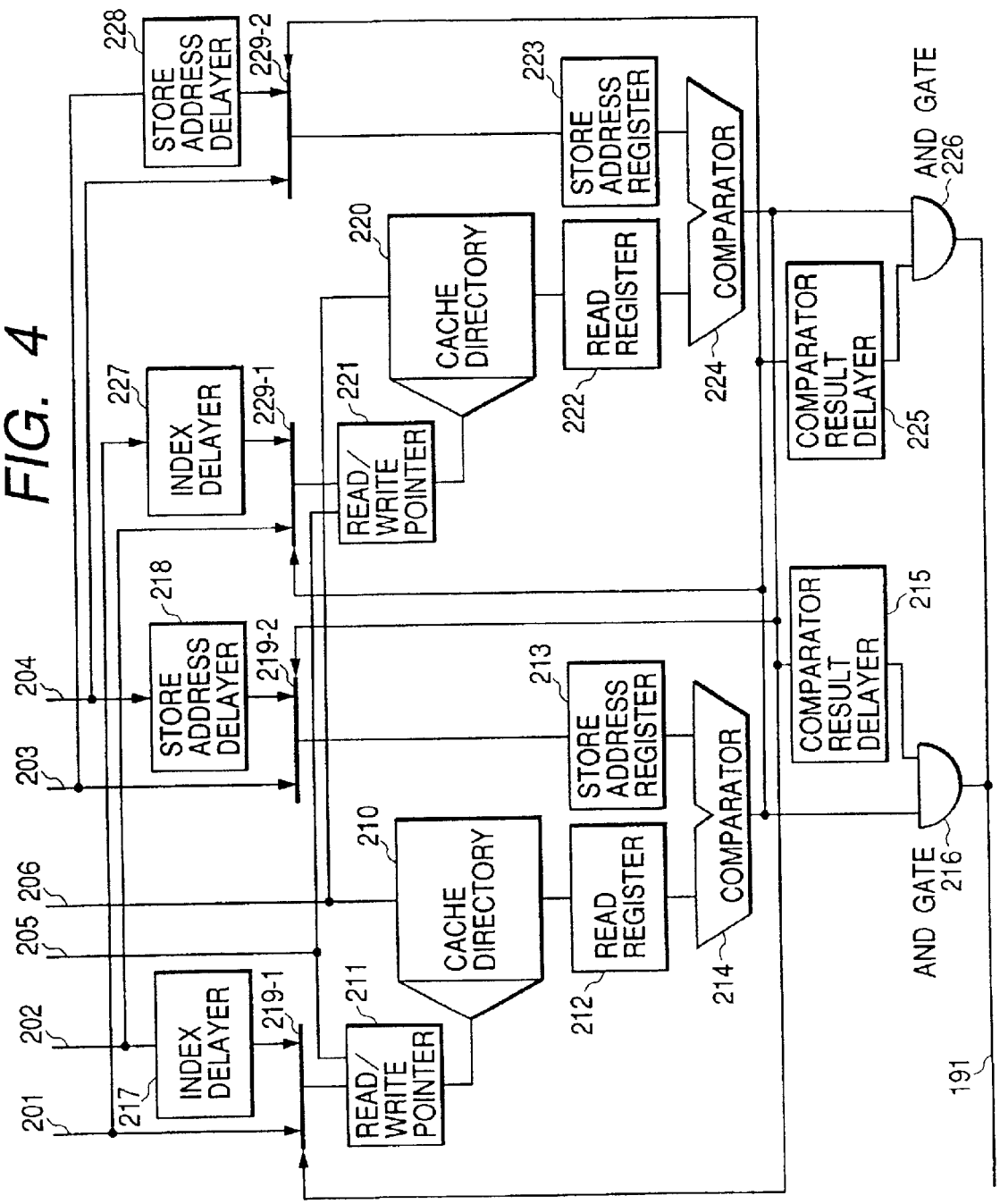
FIG. 4 gives a block diagram showing the elements around a cache directory according to a first embodiment of the present invention.

FIG. 4 is a drawing showing the architecture surrounding the cache directory according to an embodiment of the present invention. For convenience, FIG. 4 corresponds to the cache directory 151, which is a copy of the cache tag 112 of the processing device 110. In this embodiment, the elements around the cache directory include: cache directories 210, 220; read/write pointers 211, 221 for the cache directories 210, 220; read registers 212, 222; store address registers 213, 223; comparators 214, 224; comparison result delayer 215, 225; AND circuits 216, 226; index delayers 217, 227; store address delayers 218, 228; index selectors 219-1, 229-1; store address selectors 2192, 2, 229-2; and the like. Cache directory index interfaces 201, 202 are used for main storage store access information. Store address interfaces 203, 204 are used for main storage store access information. A cache directory index interface 205 is used for main storage store access information. An address tag interface 206 is used for main storage read access information.

The cache directories 210, 220 store copies of the cache tags stored in the cache of a single processing device (in this case, the processing device 110). However, in this embodiment, the bits in the address tags of the entries in the cache tag are divided in half and the halves are registered in the cache directory 210 and the cache directory 220. In other words, the cache directory 210 and the cache directory 220 do not contain identical contents. Instead, they each store half of the bits needed for the address tags. Thus, in effect, cache directories 210 and 220 may be considered sub-directories of cache directory 110.

The read/write pointers 211, 221 of the cache directories 210, 220 are pointers to entries to be read from/written to in the cache directories 210, 220. The read registers 212, 222 are registers for storing the contents read from entries in the cache directories 210, 220 as indicated by the read/write pointers 211, 221. The store address registers 213, 223 are registers used to store halves of the address used for searching the cache directories 210, 220, i.e., the address for which a write to the main storage device was performed by another processing device. The comparators 214, 224 are compare the contents of the read registers 212, 222 and the store address registers 213, 223. The comparator result delayers 215, 225 provide temporary delays in the output results from the comparators 214, 224. The AND circuits 216, 226 take the logical product of the comparator result delayer and the other comparator result. The final comparison result is reported to the processing device (in this case, the processing device 110) by way of the interface 191. The results from the AND circuits 216, 226 are the final results of comparisons of all bits of the entries in the cache directories 210, 220. The index delayers 217, 227 provide temporary delays of indexes to allow the contents of the other cache directory to be searched if there is a match with one of the cache directories. Similarly, the store address delayers 218, 228 are temporary delayers of store addresses to allow the contents of the other cache directory to be searched if there is a match in the contents of one of the cache directories. The selectors 219-1, 229-1 are selectors used to switch the path for information (cache directory index) to be sent to the read/write pointers 211, 221 between a standard path and a path with a delayer. The selectors 219-2, 229-2 are selectors used to switch the path for information (halves of store addresses) to be sent to the store address registers 213, 223 between a standard path and a path with a delayer.

FIG. 4 illustrates the embodiment were cache directories 210 and 220 are copies of tags which are direct mapped to the cache storage module. Thus, for example, read/write pointer 211, has an index to access a single entry in cache directory 210 which gives a tag that is loaded in read register 212. Read register 212 is then compared to store address register 213, which has the search request. A match is checked for in comparator 214. If there is no match, then the tag in cache tag 112 is valid (not being written to by the other processor) and the search ends. In another embodiment, cache directories 210 and 220 may be related to set associative or fully associative mapping. For example in the set associative mapping case, the read/write pointer has the index into the set; the set including a plurality of tags. These tags are searched in parallel (e.g., content addressable search). Thus the read address register 212 and comparator 214 are absent and the store address register 213 is compared directly with a series of registers in cache directory 210. In yet another embodiment with fully associative mapping, the read/write pointer is not needed, as all tags in cache directory 210 are searched. Thus FIG. 4 illustrates for easy of understanding a direct mapped cache situation, but the present invention is not so limited, but includes set associative and fully associative mapped caches. In other embodiments the cache directory may be searched sequentially rather than in parallel, which on one hand would reduce the speed of the search, but on the other hand, the cost would also be reduced.

Figure 5:
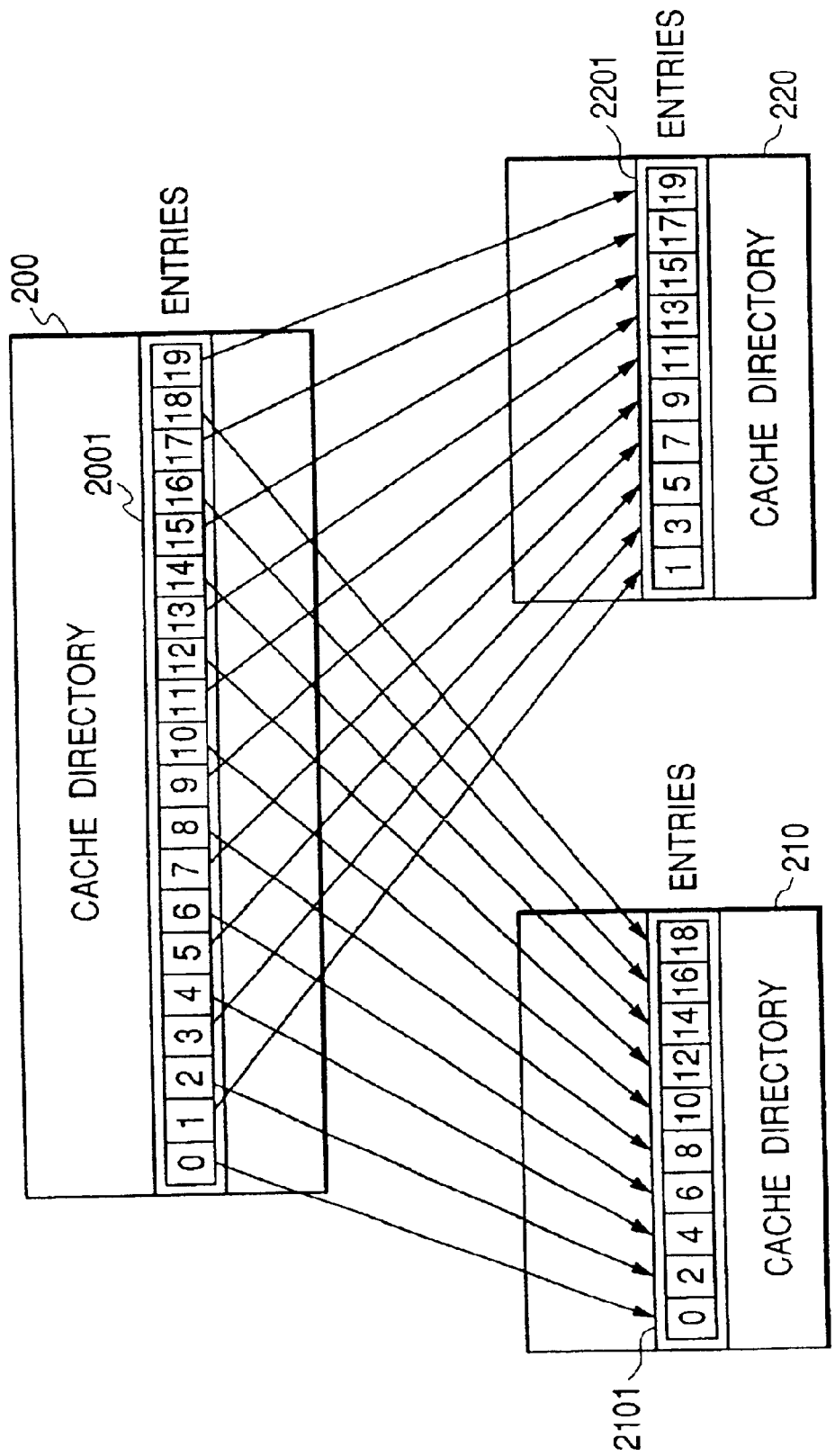
FIG. 5 shows drawing for the purpose of describing how the bits in the cache directory from FIG. 4 are divided up according to the first embodiment of the present invention.

FIG. 5 is a drawing for the purpose of describing an example of a specific image for the address tags registered in separate sections in the cache directories 210, 220 of an embodiment of the present invention. A cache directory 200 contains all the information needed for a cache directory. In other words an entry 2001 in the cache directory 200 is a copy of a single address tag in the cache tag stored in the address storage module of the processing device, and in this case contains 20 bits of information. In this embodiment, the bits (address tag) forming entries in the cache directory 200 are divided into odd bits and even bits and placed in the cache directory 210 and the cache directory 220. In other words, an entry 2101 in the cache directory 210 contains only the even bits of the information in the entry 2001 of the cache directory 200, while the entry 2201 of the other cache directory 220 contains only the odd bits of the information in the entry 2001 in the cache directory 200. The hardware for the cache directories are the same and each one contains only half of the information needed for a cache directory, but the advantage is that the directories can operate independently. In FIG. 5, the address tag is divided into odd bits and even bits, but other methods can be used such as using the first half and the second half of the address tags, or sets of two or three consecutive bits.

In FIG. 3, the coherence control device 150 queues the main storage read access information and the main storage store access information of the processing devices 110, 120 transferred from the main storage control device 130. Sets of read addresses and cache directory indexes of main storage read access information are sent to the cache directory corresponding to the local processing device. Sets of store addresses and cache directory indexes of main storage store access information are sent to the cache directory corresponding to the other processing device. Regarding the sets of store addresses and cache directory indexes of main storage store access information, if multiple main storage store access information are queued, two sets of indexes and store addresses are sent to the corresponding cache directory. The cache directory processes the two sets of indexes and store addresses at the same time. In other words, a cache directory according to this embodiment can process up to two search requests at the same time. The two cache directories 151, 152 can process up to a total of four search requests at the same time.

The following is a detailed description of the operations performed in the embodiment in FIG. 4, with emphasis on the cache directories 210, 220, which serve as the cache directory 151 for the processing device 110.

First, the operations performed for updating (registering entries in) the cache directories 210, 220 will be described. The cache directory index (hereinafter simply referred to as index) for main storage read access information for the local processing device 110 is stored in the read/write pointers 211, 221 by way of the interface 205. For main storage read addresses (address tags), half (e.g., even bits) is sent to the cache directory 210, and the other half (e.g., odd bits) is sent to the cache directory 220. As a result, for the cache directory 210 half the address tag is stored in the entry indicated by the read/write pointer 211, and for the cache directory 220 the other half of the address tag is stored in the entry indicated by the read/write pointer 221.

Next, the operations performed to search the cache directories 210, 220 in the embodiment will be described. Usually, the selectors 219-1, 229-1 are switched to the interfaces 201, 202, and the selectors 219-2, 229-2 are switched to the interfaces 203, 204. The index for the main storage write access information of the other processing device 120 provided by way of the interface 201, and the write address is provided by way of the interface 203. If, at this point, more main storage write access information of the other processing device 120 is present, the index is provided by way of the interface 202 and the write address is provided by way of the interface 204. In the description below, the operations of the set of indexes and write addresses on the path of the interfaces 201, 203 will be described. However, the basic operations of the set of indexes and write addresses on the path of the interfaces 202, 204 are similar except for the cache directory to be searched.

The index from the interface 201 is saved in the index delayer 227 and also passes through the selector 219-1 to be saved in the read/write pointer 211. As a result, the contents of the entry indicated by the read/write pointer 211 (e.g., even bits of the address tag, are read from the cache directory 210 and stored in the read register 212. Half of the store address from the interface 203 (e.g., odd bits) is saved in the store address delayer 228, and the remaining half (e.g., even bits) pass through the selector 219-2 and is saved to the store address register 213. The contents of the store address register 213 and the contents of the read register 212 are compared by the comparator 214. If there is no match, the searching of the cache directory for this write request is completed.

If there is a match, this match would only be a match with half the entry in the cache director 200 from FIG. 5. In order to compare the remaining half, the cache directory 220 on the other side is searched. In this case, after completion of searching of the cache directory 220 by way of the interfaces 202, 204 paths, the comparison results (logical 1) from the comparator 214 is saved in the comparator result delayer 225, and this comparator result signal is received and the selector 229-1 and the selector 229-2 for the opposite side are switched. As a result, the index saved in the index delayer 227 passes through the selector 229-1 and is stored in the read/write pointer 221. The contents of the entry indicated by the read/write pointer (e.g., odd bits from the address tag) are read from the cache directory 220 and stored in the read register 222. The half of the store address saved in the store address delayer 228 (e.g., odd bits) passes through the selector 229-2 and is stored in the store address register 223. The contents of the store address register 223 and the contents of the read register 222 are compared by the comparator 224. The AND circuit 226 determines the logical product of the comparison result and comparison result from the comparator 214 that had been delayed by the comparator result delayer 225. The result is the final result of the comparison of all bits in the entry from the cache directory 200 from FIG. 5. If the final result is true, there is a match between the contents of the store address and the cache directory. The processing device 110 is then notified that this entry in the cache storage module 111 is invalid.

Figure 6:
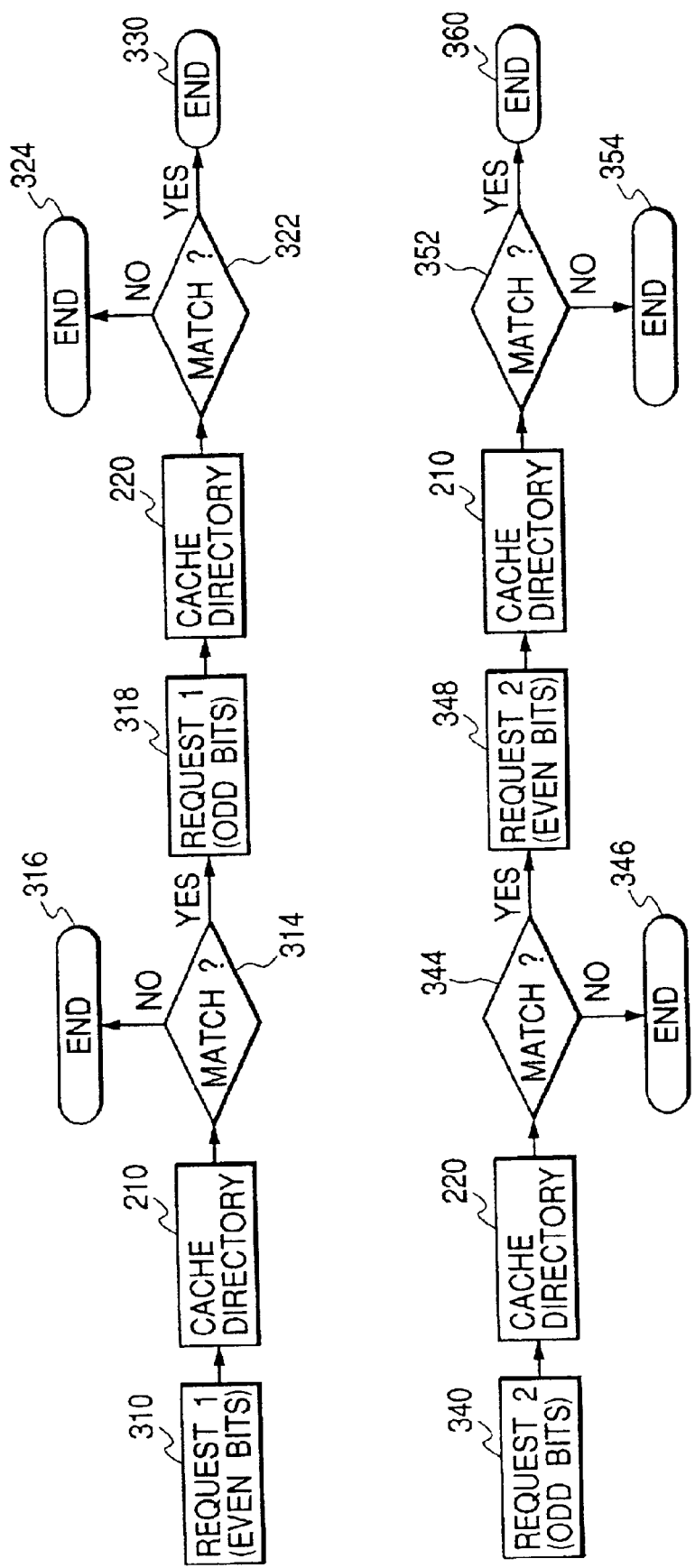
FIG. 6 has a simplified block diagram illustrating an example of two requests being processed concurrently of an embodiment of this invention.

FIG. 6 has a simplified block diagram illustrating an example of two requests being processed concurrently of an embodiment of this invention. FIG. 6 shows how the hardware in FIG. 4 processes two requests, Request_1 and Request_2 which have a format of FIG. 5, that is, each request is divided into odd and even bits. Request_1 310 has the even bits of Request_1, and Request_2 340 has the odd bits of Request_2. Cache directory 210 has the even bits of cache directory 200 in FIG. 5. And cache directory 220 has the odd bits of cache directory 200 in FIG. 5. The even bits in Request_1 310 are first stored in store address register 213 and then compared to the address tag in read register 212 using read/write pointer 211 on cache directory 210. If there is no match 314 between the tag in store address register 213 and the tag in read register 212, then Request_1 is not in cache directory 200, and no action is needed (end 316). If there is match of the even bits, then the odd bits of Request_1 318 need to be checked using cache directory 220. A match 322 is tested between read register 222 and store address register 223. If there is no match then the search ends 324. If there is a match, then the cache tag in read register 222, as indexed by read/write pointer 221, is invalid and the corresponding data, for example, that in cache storage module 11 must be replaced. As explained above, in other embodiments cache directories 210 and 220 may be set associative or fully associatively mapped, thus a partial or full content addressable search may be done.

The odd bits in Request_2 340 can be processed concurrently with the even bits in Request_1 310, as the odd bits 340 use cache directory 220, instead of cache directory 210. From FIG. 6, the processing of Request_2 on cache directory 200, is like that of Request_1, except the odd bits 340 are processed before the even bits 348, if necessary (where a no match at 344 will end 346 the process).

In this embodiment, if the addresses indicated in contents of the cache directories, i.e., the cache address tag in a processing device, and write operations performed by processing devices to the main storage devices are similar, the two cache directories can be searched at the same time but processing may require two cycles so not much advantage may be provided. However, with high-capacity main storage devices that are currently common, if the processing devices use addresses in the main storage in localized areas, a comparison between half the bits of the address tag in a cache directory and the store address may often determine a non-match. Thus, the coherence control device will typically allow search requests in the two cache directories at the same or similar time for each processing device, because such search requests should typically take one clock cycle. Also, to facilitate the description, FIG. 3 shows two processing devices for illustration purposes only and should not be construed as a limitation on this invention.

Figure 7:
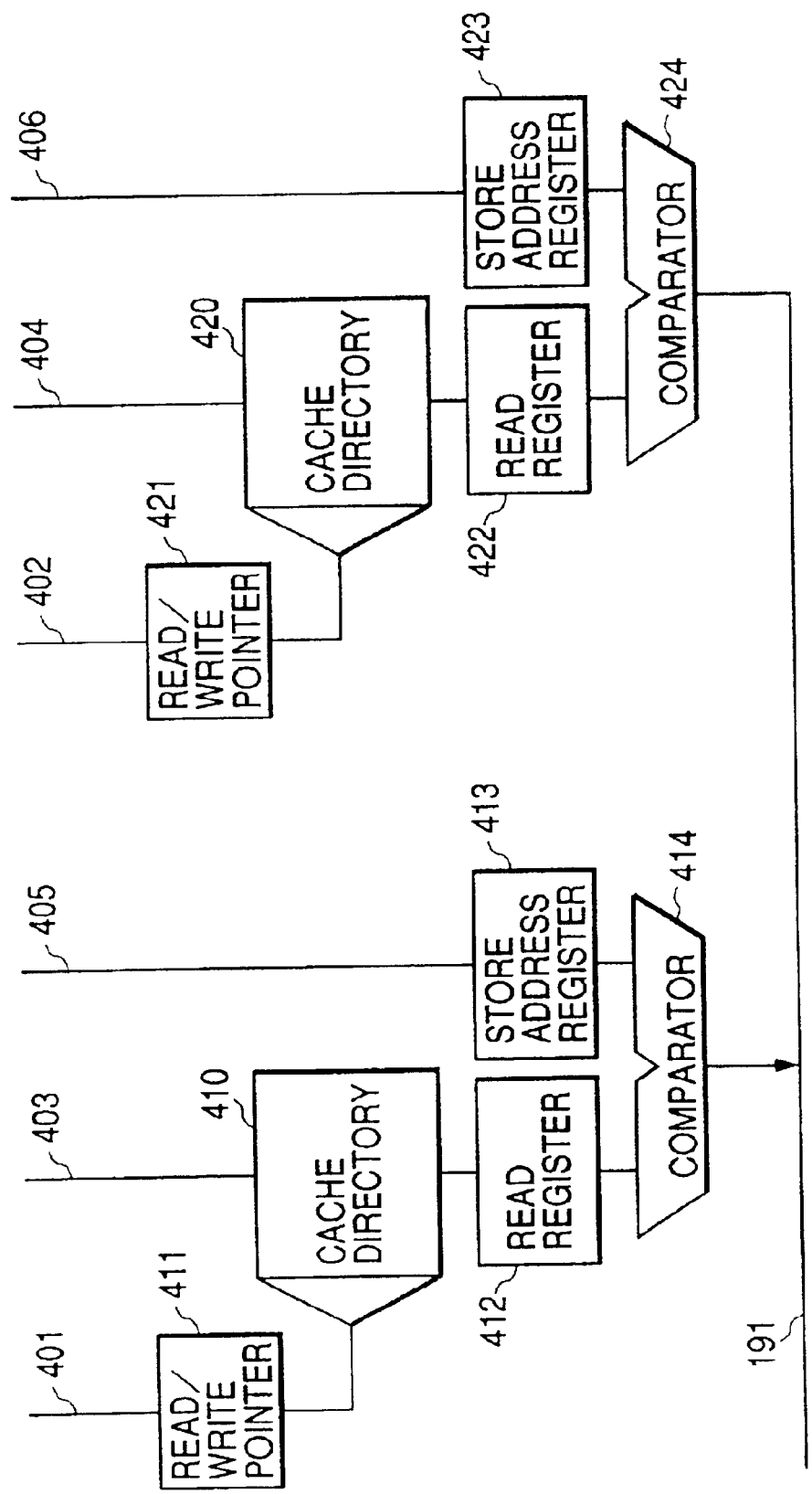
FIG. 7 shows a block diagram showing the elements around a cache directory according to a second embodiment of the present invention.

FIG. 7 is a drawing showing the elements around the cache directory according to another embodiment of the present invention. As with FIG. 4, this architecture corresponds to that of the cache directory 151, which is a copy of the cache tag 111 stored in the processing device 110 from FIG. 3. The elements around the cache directory in this embodiment include: cache directories 410, 420; read/write pointers 411, 421 for the cache directories 410, 420; read registers 412, 422; store address registers 413, 423; and comparators 414, 424. Index interfaces 401, 402 are used for main storage store access information and main storage read access information. Read address interfaces 403, 404 are used for main storage read access information. Address interfaces 405, 406 are used for main storage store access information.

The cache directories 410, 420 correspond to a single cache directory (in this case, the cache directory 151 from FIG. 3) which is a copy of the cache tag stored in the processing device. In this embodiment, a cache directory entry is divided in half and the halves are entered separately in the cache directory 410 and the cache directory 420, thus allowing the cache directories 410, 420 to operate as independently operable banks. This improves the performance when entering information into or searching the cache directories. Rather than containing the same information, the cache directory 410 and the cache directory 420 store halves of each entry.

The read/write pointers 411, 421 of the cache directories 410, 420 are pointers used when reading from or writing to the cache directories 410, 420. The read registers 412, 422 are registers in which are stored the contents of the entries indicated by the read/write pointers 411, 421. The store address registers 413, 423 are registers storing address to be searched in the cache directory, i.e., write addresses for write operations performed by another processing device to the main storage device. The comparators 414, 424 are logic circuits used to compare the read registers 412, 422 and the store address registers 413, 423. As explained previously for cache directories 210 and 220, in other embodiments cache directories 410 and 420 may be similarly set associative or fully associatively mapped, thus a partial or full content addressable search may be done.

Figure 8:
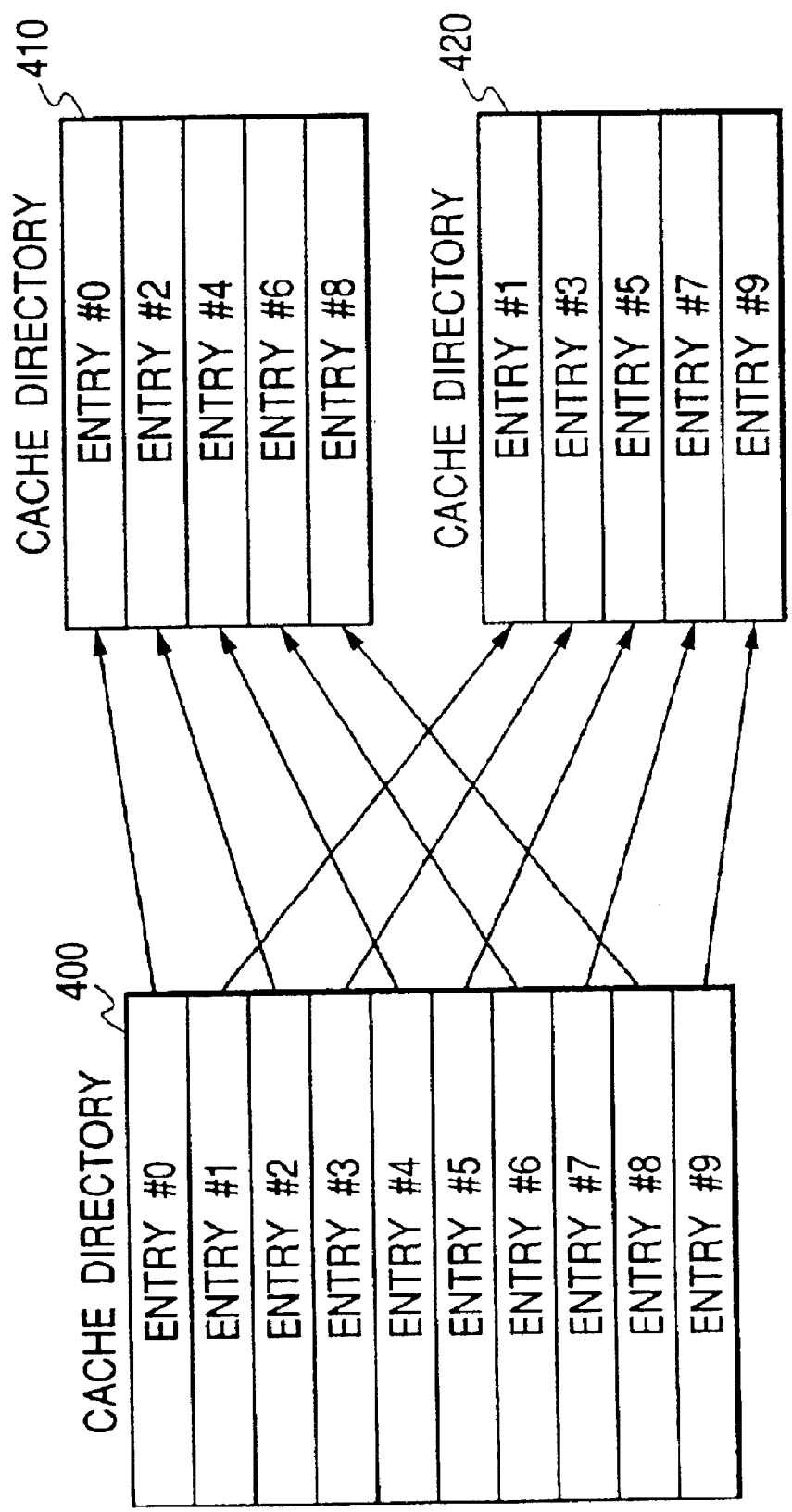
FIG. 8 shows a drawing for the purpose of describing how entries in the cache directory from FIG. 7 are divided up according to the second embodiment of the present invention.

FIG. 8 is a drawing for the purpose of describing a specific image of an entry split and entered in the cache directories 410, 420 in an embodiment of the present invention. A cache directory 400 contains all the information needed to serve as a cache directory. In this case, the cache directory 400 holds 10 entries as copies of the cache tags stored in a processing device. In the previous embodiment, the address tag of an entry was divided up by bits. In this embodiment, the entries 400 of the cache directory are divided up into odd entries and even entries, and these are placed in the cache directory 410 and the cache directory 420. The hardware used for the cache directories is the same or similar. Each cache directory will contain only half the entries needed to function as a cache directory, but the advantage with this is that the cache directories can operate independently. In FIG. 8, the entries were divided into odd entries and even entries, but it would also be possible to divide the entries into a first half and a second half.

Figure 9:
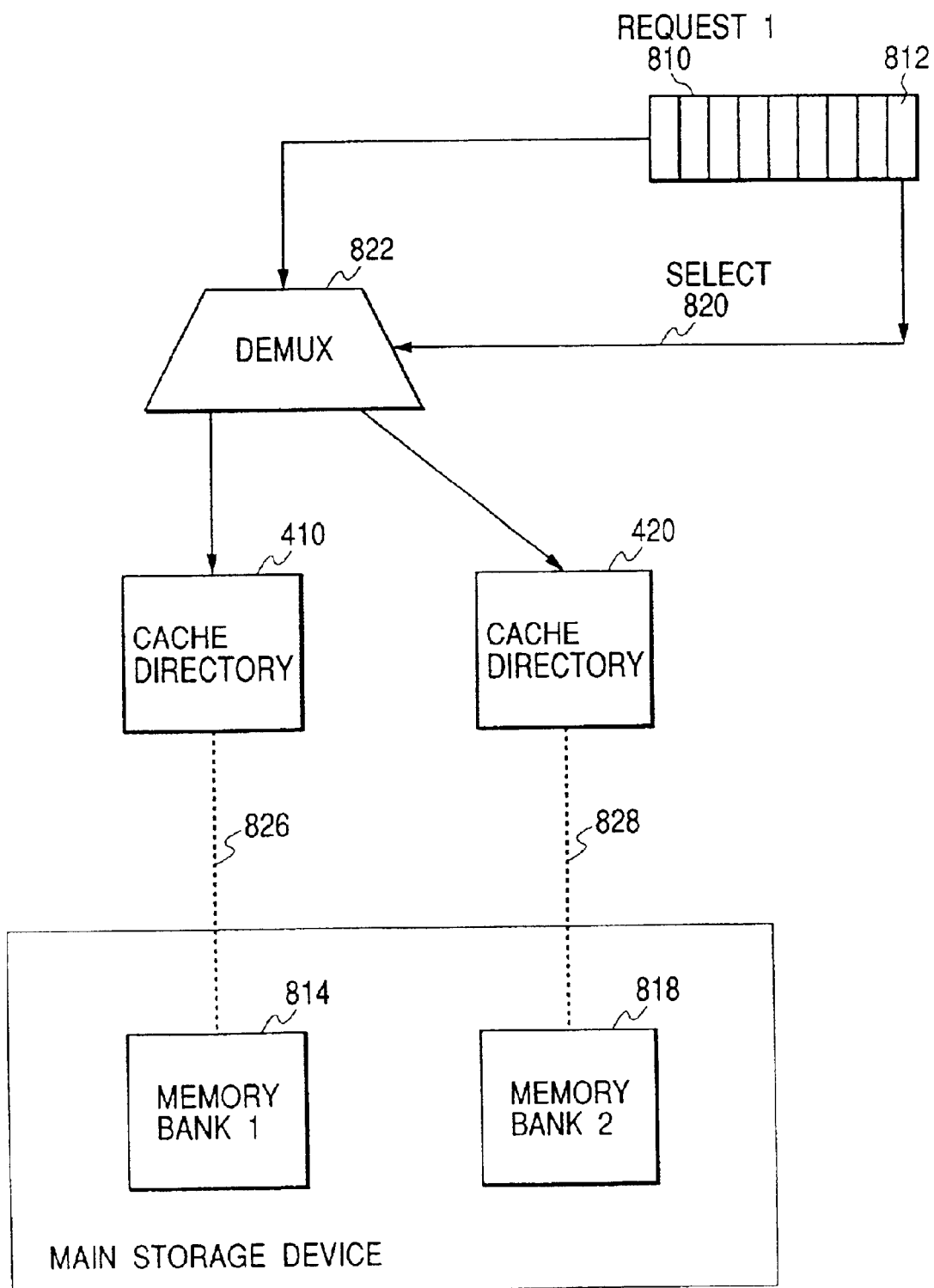
FIG. 9 is a drawing for the purpose of describing a specific image of an entry split and entered in the cache directories 410, 420 in an embodiment of the present invention.

FIG. 9 gives a simplified block diagram illustrating the use of the odd and even entries of FIG. 8 in accessing the cache sub-directories of an embodiment of the present invention. First, a search request, Request_1 810 is received for cache directory 400. Cache directory 400 in this example corresponds to cache directory 151 from FIG. 3 and in this example, let cache directory 151 correspond to cache tag 112 in processing device 110. If processing device 110 accesses two memory banks, for example, Memory Bank 1 814 and Memory Bank 2 818, of main memory 140 (FIG. 3), then the search request includes an identification which memory bank the request is to. Thus one or more bits of the search request, for example, bit 812 of Request_1 810, may be used to select which cache sub-directory, e.g., 410 or 420, to search. In this case bit 812 identifies the even or odd entries in FIG. 8. For example. if bit 812 is zero in Request_1 810, then select line 820 chooses from DeMux 822, the path to Cache Directory 410. Cache Directory 410 is associated with Memory Bank 1 814 (dotted line 826) and bit 812 chooses this memory bank. Thus the cache directory search is reduced by half. In addition the two cache sub-directories, 410 and 420, may operate independently.

Figure 10:
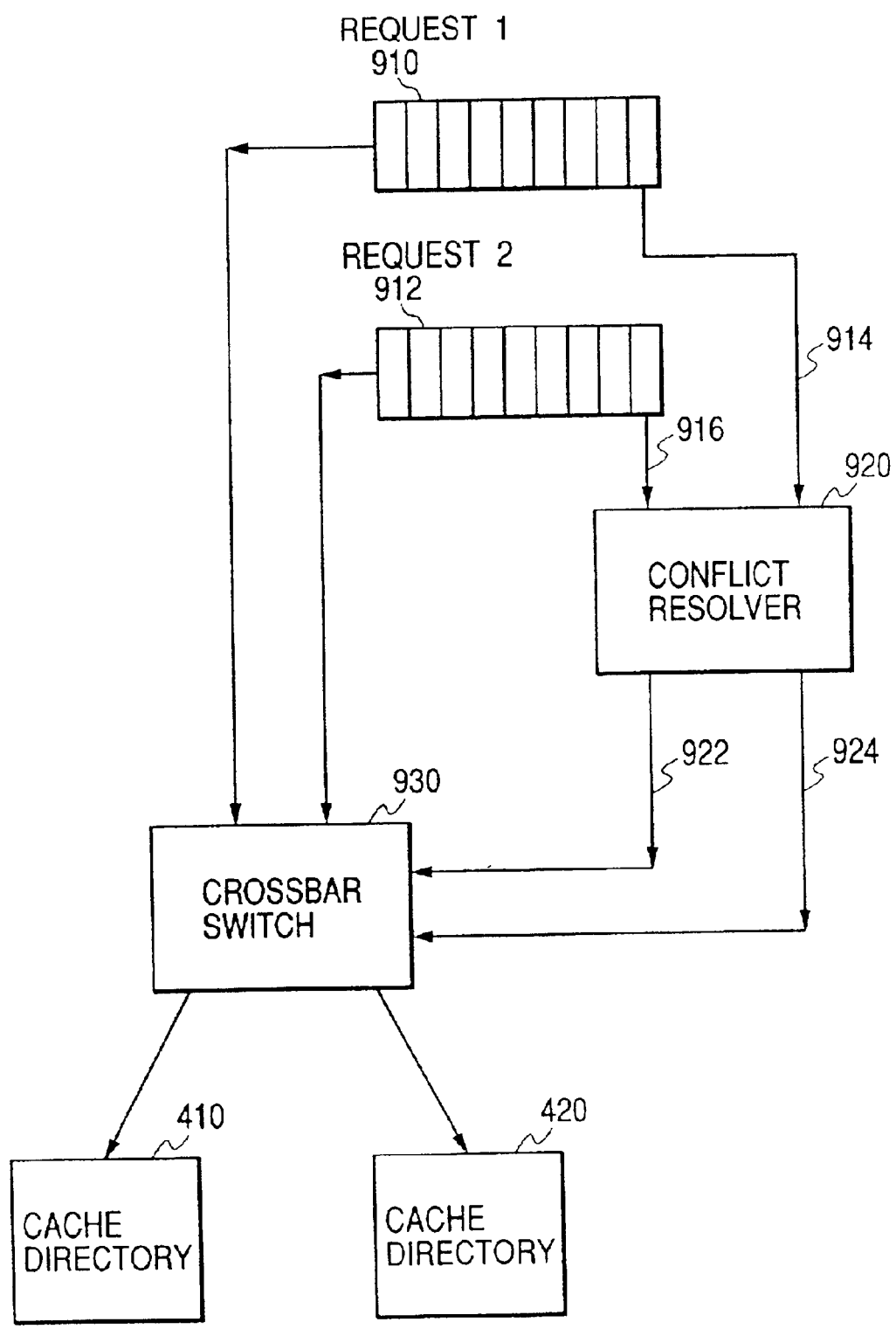
FIG. 10 illustrates an embodiment of this invention were two requests may be processed concurrently.

FIG. 10 illustrates an embodiment of this invention were two requests may be processed concurrently. The format of the two requests is given by FIG. 8, were for example, Request_1 910 is an even request and Request_2 912 is an odd request. The bit 914 of Request_1 910 indicates access to Cache Directory 410, which is associated with Memory Bank 1 814. And the bit 916 of Request_2 912 indicates access to Cache Directory 420, which is associated with Memory Bank 2 818. The bits 914 and 916 are first sent to a Conflict Resolver 920, which insures that there are not two requests trying to access the same memory bank at the same or similar time. If there is simultaneous access one request may be queued or blocked. In this case there is not, as the even and odd requests access different banks. A crossbar switch 930 is set to allow Request_1 910 to go to Cache Directory 410 and Request_2 912 to got to Cache directory 420, so that both requests may be operated on concurrently.

Since the cache directory is divided into two based on entries, when the cache directory is searched, one entry being searched can be an odd entry while another entry being searched can be an even entry, thus allowing two cache directory search requests to be processed at the same time for the cache directory 410 and the cache directory 420. Compared to a configuration with no splitting up of entries, the same cache directory size can be used to provide twice the search performance for the cache directory. Furthermore, in registering information in a cache directory, using different entries as described above may allow two cache directory registration requests to be performed at the same time for the cache directory 410 and the cache directory 420. Also, if an entry for searching and an entry for registering are of different types, a cache directory search request and a cache directory registration request can be processed at the same time. In FIG. 7, the essential operations are similar to those of independently operating memory banks, so a description of these operations will be omitted.

In FIG. 4 and FIG. 7, the cache directory is divided in two. However, these are just examples for illustration purposes only and should not be construed as a limitation on this invention. For example three or more divisions may be used.

In an embodiment of the present invention as described above, a multi-processor system is formed from a plurality of processing devices equipped with high-capacity cache storage modules and connected to a main storage device. A device for maintaining cache coherence through hardware is provided in the form of a coherence control device that prepares a cache directory that is a copy of address tags stored in the plurality of processing devices. The size of the cache directory can be kept small while providing high cache directory search performance.

The preceding has been a description of the preferred embodiment of the invention. It will be appreciated that deviations and modifications can be made without departing from the scope of the invention, which is defined by the appended claims.

What is claimed is:

1. A cache directory configuration method for maintaining coherence between a plurality of caches, wherein each cache comprises a copy of a section of said main memory, said method comprising:

storing copies of address tags stored in said plurality of caches in a cache directory which has at least one entry each including a plurality of bits, wherein the bits of each entry in said cache directory are divided into a plurality of parts; and processing a plurality of search requests concurrently using said plurality of parts, wherein the plurality of parts comprise a first sub directory having even bits of each entry in the cache directory and a second sub directory having odd bits of each entry in the cache directory.

2. The cache directory configuration method of claim 1 further comprising:

partitioning a search address tag associated with said search request into a plurality of sections;

responsive to said search request, determining if a first section of said plurality of sections matches an entry in a first part of said plurality of parts; and when no match is indicated for any entry in said first part, returning a result.

3. The cache directory configuration method of claim 2, further comprising:

when a match is indicated for any entry in said first part, determining if a second section of said plurality of sections matches an entry in a second part of said plurality of parts.

4. The cache directory configuration method of claim 1 wherein:

each entry in said cache directory is divided up into a plurality of entry groups; and each entry group can be operated on independently.

5. The cache directory configuration method of claim 1 further comprising:

responsive to a search request of said plurality of search requests, determining if said search request matches any entry in a part of said plurality of parts; and when a match is indicated, returning a result.

6. A method for searching a cache directory used to maintain coherence between a cache and a main memory, comprising a plurality of memory banks, in a multi-processor system, the cache directory, comprising a plurality of sections each having a plurality of bits, the method comprising:

receiving a write request address by the cache directory to the main memory from another processor;

determining from the write request address a memory bank of the plurality of memory banks;

selecting a section of the plurality of sections associated with the memory bank, wherein the bits of each section in said cache directory are divided into a plurality of parts; and searching the section for the write request address using the plurality of parts.

7. The method of claim 6 wherein the determining includes using a bit of the write request address.

8. The method of claim 6 wherein the section comprises every other entry in the cache directory.

9. A system for searching a cache directory used to maintain coherence between a cache and a main memory, comprising a plurality of memory banks, in a multi-processor system, the cache directory comprising a plurality of sub-directories, each subdirectory associated with a memory bank of the plurality of memory banks, the system comprising:

an input module for receiving a plurality of requests to the cache directory;

a crossbar switch for coupling the input module with the plurality of sub-directories, each subdirectory including at least one entry having a plurality of bits, wherein the bits of each entry are divided into a plurality of parts; and a control module for routing a first request of the plurality of requests to a first subdirectory of the plurality of sub-directories and a second request of the plurality of requests to a second subdirectory of the plurality of sub-directories for concurrent searching of the first and second subdirectories using the plurality of parts, when the first and second requests address different memory banks of the plurality of memory banks.

10. A method for searching a cache directory used in maintaining coherence among caches in a multiprocessor system, the cache directory having at least one entry each including a plurality of bits, the method comprising:

partitioning the bits of each entry in the cache directory into a plurality of parts, wherein each part of the plurality of parts is searched concurrently with another part of the plurality of parts;

partitioning a plurality of requests to the cache directory into a plurality of sub-requests, wherein each sub-request corresponds to a part of the plurality of parts: and searching in parallel, each part using an associated sub-request, wherein each part is associated with a memory bank of the multi-processor system.

11. A method for searching a cache directory used in maintaining coherence among caches in a multiprocessor system, the cache directory having at least one entry each including a plurality of bits, the method comprising:

partitioning the bits of each entry in the cache directory into a plurality of parts, wherein each part of the plurality of parts is searched concurrently with another part of the plurality of parts;

partitioning a plurality of requests to the cache directory into a plurality of sub-requests, wherein each sub-request corresponds to a part of the plurality of parts: and searching in parallel, each part using an associated sub-request, wherein a sub-request of the plurality of sub-requests comprises the even bits of the request.

12. A method for searching a cache directory used in maintaining coherence among caches in a multiprocessor system, the cache directory having at least one entry each including a plurality of bits, the method comprising:

partitioning the bits of each entry in the cache directory into a plurality of parts, wherein each part of the plurality of parts is searched concurrently with another part of the plurality of parts;

partitioning a plurality of requests to the cache directory into a plurality of sub-requests, wherein each sub-request corresponds to a part of the plurality of parts: and searching in parallel, each part using an associated sub-request, wherein a part of the plurality of parts has entries which are an odd entries in the cache directory.

13. A cache directory configuration system for maintaining coherence between a plurality of caches, wherein each cache comprises a copy of a section of said main memory, said system comprising:

a cache directory, comprising copies of address tags stored in said plurality of caches, each copy of address tag having a plurality of bits, wherein the bits of each copy of address tag in said cache directory are divided into a plurality of parts; and a plurality of units for processing a plurality of search requests concurrently using said plurality of parts, wherein the plurality of parts comprise a first sub directory having even bits of each entry in the cache directory and a second sub directory having odd bits of each entry in the cache directory.

14. The cache directory configuration system of claims 13 further comprising:

a selector module for partitioning a search address tag associated with said search request into a plurality of sections; and a first comparison module, responsive to said search request, for determining if a first section of said plurality of sections matches an entry in a first part of said plurality of parts and when no match is indicated for any entry in said first part, returning a result.

15. The cache directory configuration system of claim 14, further comprising:

when a match is indicated for any entry in said first part, a second comparison module for determining if a second section of said plurality of sections matches an entry in a second part of said plurality of parts.

16. The cache directory configuration system of claim 13 wherein:

each entry in said cache directory is divided up into a plurality of entry groups; and each entry group can be operated on independently.

17. The cache directory configuration system of claim 13 further comprising:

a comparison module, responsive to a search request of said plurality of search requests, for determining if said search request matches any entry in a part of said plurality of parts, and when a match is indicated, returning a result.

18. A system for searching a cache directory used to maintain coherence between a cache and a main memory, comprising a plurality of memory banks, in a multi-processor system, the cache directory, comprising a plurality of sections each including a plurality of bits, the system comprising:

an input module configured to receive a write request address by the cache directory from another processor, wherein the bits of each section in the cache directory are divided into a plurality of parts;

a bank selector module configured to determine from the write request address, a memory bank of the plurality of memory banks;

a switch configured to select a section of the plurality of sections associated with the memory bank; and a comparison module configured to search the section for the write request address using the plurality of parts.

19. A method for searching a cache directory used in maintaining coherence among caches in a multiprocessor system, the method comprising:

partitioning the cache directory into a plurality of parts, wherein each part of the plurality of parts is searched concurrently with another part of the plurality of parts;

partitioning a plurality of requests to the cache directory into a plurality of sub-requests, wherein each sub-request corresponds to a part of the plurality of parts; and searching in parallel, each part using an associated sub-request;

wherein a sub-request of the plurality of sub-requests comprises the even bits of the request.

20. A method for searching a cache directory used in maintaining coherence among caches in a multiprocessor system, the method comprising:

partitioning the cache directory into a plurality of parts, wherein each part of the plurality of parts is searched concurrently with another part of the plurality of parts;

partitioning a plurality of requests to the cache directory into a plurality of sub-requests, wherein each sub-request corresponds to a part of the plurality of parts; and searching in parallel, each part using an associated sub-request;

wherein a part of the plurality of parts has entries which are an odd entries in the cache directory.

21. A cache directory configuration system for maintaining coherence between a plurality of caches, wherein each cache comprises a copy of a section of said main memory, said system comprising:

a cache directory, comprising copies of address tags stored in said plurality of caches, wherein said cache directory is divided into a plurality of parts;

a plurality of units for processing a plurality of search requests concurrently using said plurality of parts;

a selector module for partitioning a search address tag associated with said search request into a plurality of sections; and a first comparison module, responsive to said search request, for determining if a first section of said plurality of sections matches an entry in a first part of said plurality of parts and when no match is indicated for any entry in said first part, returning a result, wherein the plurality of parts comprise a first sub directory having even bits of each entry in the cache directory and a second sub directory having odd bits of each entry in the cache directory.

22. The cache directory configuration system of claim 21, further comprising:

when a match is indicated for any entry in said first part, a second comparison module for determining if a second section of said plurality of sections matches an entry in a second part of said plurality of parts.

23. A cache directory configuration system for maintaining coherence between a plurality of caches, wherein each cache comprises a copy of a section of said main memory, said system comprising:

a cache directory, comprising copies of address tags stored in said plurality of caches, wherein said cache directory is divided into a plurality of parts;

a plurality of units for processing a plurality of search requests concurrently using said plurality of parts; and a comparison module, responsive to a search request of said plurality of search requests, for determining if said search request matches any entry in a part of said plurality of parts, and when a match is indicated, returning a result, wherein the plurality of parts comprise a first sub directory having even bits of each entry in the cache directory and a second sub directory having odd bits of each entry in the cache directory.

* * * * *